Feb. 5, 1929.
F. M. JEFTS
ARC WELDING
Filed Nov. 23, 1927
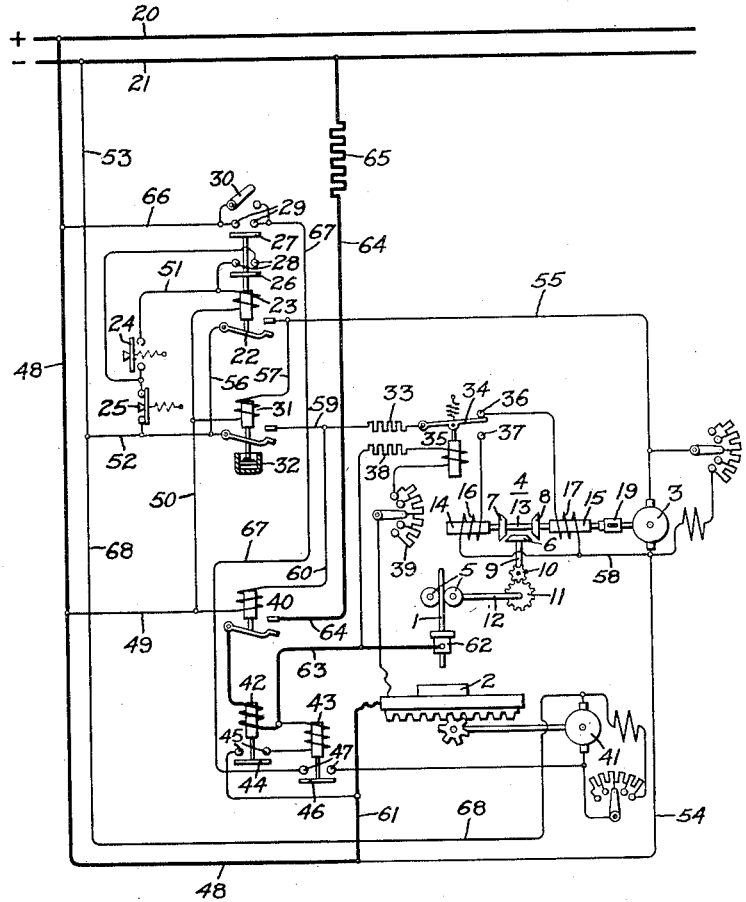
Inventor:
Frank M. Jefts,
by Alexander S. [illegible]
His Attorney Patented Feb. 5, 1929.

1,701,372

UNITED STATES PATENT OFFICE.

FRANK M. JEFTS, OF SCOTIA, NEW YORK, ASSIGNOR TO GENERAL ELECTRIC COMPANY, A CORPORATION OF NEW YORK.

ARC WELDING.

Application filed November 23, 1927. Serial No. 235,325.

My invention relates to electric arc welding and more particularly to an improved control system for automatic arc welding machines.

Automatic arc welding machines are now well known. In such machines means are provided for striking an arc between the work to be welded and an electrode which as it is consumed in the arc is automatically fed toward the work to maintain the arc. Various control systems have been provided for controlling the feeding means to strike and maintain the arc and for controlling the welding circuit and the travel of the work relative to the electrode during the welding operation.

It is an object of my invention to provide an improved system which functions in a manner to stop the electrode feeding mechanism a predetermined interval of time before the interruption of the welding circuit.

A further object of my invention is to provide in such a system means for arresting the relative movement of traverse between the electrode and the work either concurrently with the stoppage of the electrode feed or the opening of the welding circuit, depending on the nature of the work being welded.

By controlling the welding operation in this manner I am enabled to secure certain desired results. For example, if the system is adjusted to stop the electrode feed and the traverse of the work relative to the electrode a predetermined interval of time before the opening of the welding circuit, the crater formed at the end of the seam during welding is filled up and the electrode by fusing away is cleared of the work a certain distance making it easier to remove the finished work and to insert new work into the machine. If, on the other hand, the travel of the work relative to the electrode is interrupted concurrently with the interruption of the welding circuit the bead of deposited metal is tapered in such a manner that one seam may be led on to another or onto itself without noticeably increasing the thickness of the bead at the part where the deposits overlap.

My invention will be better understood from the following description taken in connection with the accompanying drawing and its scope will be pointed out in the appended claims.

In the accompanying drawing, the single figure diagrammatically represents one embodiment of my invention in which an electric motor is arranged to traverse the work with respect to the welding electrode and in which an electric motor is arranged to actuate through suitably controlled transmission means the welding electrode to draw or strike the welding arc and to feed the electrode to the work at a rate varying with variations of the voltage of the arc.

In the system illustrated the electrode 1 is fed toward and away from the work 2 by a constant speed motor 3, the rate of electrode feed being controlled by a regulating means 4 arranged between the constant speed driving means 3 and the electrode feeding rolls 5.

The regulating means 4 comprises a driven element 6 and two driving elements 7 and 8. The driving elements are rotated in the same direction by motor 3 and located relative to the driven element so that when in engagement therewith one will rotate it in one direction and the other in the other direction. The driven element 6 is connected through a shaft 9, suitable speed reducing gears represented by gears 10 and 11 and shaft 12 to the feed rolls 5 and depending on the direction of rotation given to it will turn the feed rolls in one direction or the other to feed the electrode to or away from the work 2. The driving elements 7 and 8 are mounted on a shaft 13 upon which are also mounted cores 14 and 15. These cores are under the control of coils 16 and 17 and depending upon which coil is excited element 7 or 8 will be caused to engage element 6 by reason of a lateral displacement of shaft 13, elements 7 and 8, and core 14 and 15. In order to permit this movement an adjustable coupling 19 is provided between shaft 13 and motor 3 although it will be apparent that other arrangements may be used. For example, elements 7 and 8 may be fixed to cores 14 and 15 which are splined to shaft 13 and normally held out of engagement with element 6 by spring members whose force is overcome when coil 16 or 17 is energized. The engaging surfaces of the elements 6, 7 and 8 may be smooth or rough. I prefer to use smooth surfaces which are held in firm engagement with one another by a magnetic attraction secured by closing the flux path of coil 16 or 17 through these elements.

The feed motor 3 is connected to a source of power 20—21 through a switch 22 which is controlled by operating coil 23. The energization of coil 23 is under the control of start button 24 and stop button 25. Associated with switch 22 are contact members 26 and 27 which control circuits including contacts 28 and 29. The arrangement is such that when switch 22 is closed contact members 26 and 27 complete circuits through contacts 28 and 29 and when switch 22 is open these circuits are opened at contacts 28 and 29. Means, shown in the drawing as a switch 30, is provided for overcoming the effect of contact member 27 on the circuit including contacts 29. This switch is adapted to short circuit the contacts 29 and thus eliminate the control of contact member 27 over the circuit including contacts 29.

Switch 22 controls the energization of relay 31 which has a time delay opening characteristic. As illustrated, this relay is provided with a dashpot 32 for securing this time delay in opening. It will be understood that other types of time delay relays may be used. Relay 31 controls the energization of the circuit including coils 16 or 17 of the regulating means 4, the circuit including resistance 33, contact element 34 of contact making voltmeter 35 and contacts 36 or 37.

The operating coil of the contact making voltmeter 35 is connected across the electrode 1 and work 2 through a circuit including a fixed resistance 38 which may be omitted and a variable resistance 39. As thus connected the voltmeter is responsive to variations in voltage of the welding arc maintained between the electrode 1 and the work 2 and operates to complete the circuit through coils 16 and 17 of the regulating means 4 to draw or strike the welding arc and to feed the electrode to the work at a rate varying with variations of the voltage of the arc to maintain the arc length substantially constant at a length depending on the setting of the variable resistance 39. Relay 31 also controls the energization of the electromagnetic switch 40 which controls the welding circuit indicated in heavy black lines in the drawing.

Means comprising a travel motor 41 are provided for traversing the work 2 relative to the electrode 1. The energization of this motor is under the control of relays 42 and 43, as well as switch 22 and switch 30. Switch 22 exerts its control through contact member 27 which is adapted to control the travel motor circuit at contacts 29.

Relay 42 is a series relay included in the welding circuit and when energized, its contact member 44 completes the circuit of relay 43 through contacts 45 which, when this circuit is completed, is connected across the arc established and maintained between the electrode 1 and work 2. Relay 43 controls through its contact member 46 the energization of the travel motor 41 whose circuit includes contacts 47.

Under different conditions of use it will be found necessary to alter the rate of electrode feed and the rate of travel of the work relative to the electrode. There are many ways in which these results may be secured. In the drawing I have illustrated controlling resistances in the fields of motors 3 and 41 which may be used to control the field strength of the respective motors and thus the speeds of these motors.

With this preliminary description the system may most easily be explained by describing the manner of setting it in operation which is as follows, bearing in mind that the various switches as illustrated in the drawing are shown in their deenergized positions. To start the welding machine the operator closes start button 24 which completes a circuit from supply conductor 20, through conductors 48, 49 and 50, through coil 23 of switch 22, thence through conductor 51, start button 24 and stop button 25, conductors 52 and 53 to the other supply conductor 21. This causes the coil 23 to be energized which closes switch 22 and at the same time completes circuits including contacts 28 and 29 through contact members 26 and 27 operated simultaneously with switch 22. The completion of the circuit through contacts 28 completes the circuit just traced through coil 23 in shunt to the start button 24 so that this button may now be released without deenergizing coil 23 and switch 22 will be held in its closed position. The closing of switch 22 completes a circuit through feed motor 3 from supply conductor 20, through conductors 48, 54, 55, switch 22 and conductors 56, 52 and 53 to the other supply conductor 21. The closing of this switch also completes the circuit of the operating coil of relay 31 from the supply conductors 20, 21 through conductors 48, 49, 50, coil of relay 31, conductor 57, switch 22, conductors 56, 52 and 53. Contacts of relay 31 will close practically simultaneously with the closing of switch 22 and complete a circuit from supply conductors 21—22 through either coils 16 or 17 as follows: Conductors 48, 54, 58, either coil 17 or 16, either contacts 36 or 37, contact member 34 of contact making voltmeter 35, resistance 33, conductor 59, relay 31 and conductors 52 and 53.

The closing of relay 31 also completes the circuit of the electroresponsive switch 40 which controls the welding circuit across the supply conductors 20—21 through conductors 48 and 49, the operating coil of switch 40, conductors 60 and 59, contacts of relay 31 and conductors 52 and 53. The closing of switch 40 completes the welding circuit from conductors 20—21 up to the electrode 1 and the work 2 through conductors 48 and 61, work 2, electrode 1, nozzle 62, conductors 63, coil of relay 42, switch 40, conductor 64 and regulating or stabilizing resistance 65.

The line voltage thus imposed across the electrode 1 and work 2 will actuate the contact making voltmeter 35 to complete a circuit through contacts 37 and coil 16 causing feeding means 4 to feed the electrode into engagement with the work. Thereupon coil 35 of the voltmeter will be short-circuited and the spring associated with the voltmeter will cause the contact member 34 to engage contact 36 and complete a circuit through coil 17 which will cause the regulating means 4 to withdraw the electrode from the work and strike the arc. Upon the arc attaining a given length and voltage the voltmeter 35 will again complete a circuit through contact 37 and coil 16 to feed the electrode. Thereafter contact member 34 of the voltmeter will vibrate between contacts 36 and 37 to control the regulating means 4 in a manner to feed the electrode at a rate suitable to maintain the arc length constant. The speed of the electrode motor is constant, as has been stated before, but is greater than necessary to feed the electrode at a rate substantially equal to the normal consumption of the electrode in the arc. It is for this reason that the contact making voltmeter is in continual operation causing elements 7 and 8 to be constantly engaging and disengaging the driven element 6 in a manner to secure the desired rate of electrode feed.

Upon the flow of welding current in the welding circuit, relay 42 is energized and upon closing completes a circuit through coil 43, through its contact member 44 and contacts 45. Relay 43 is thus connected across the welding arc and when the arc voltage attains a predetermined value will operate to close a circuit of the travel motor 41 through contacts 47 and its contact member 46. Thus when the arc has been established the travel motor 41 is connected to the source of supply through conductors 48 and 66, contacts 29 and contact member 27, conductor 67, contacts 47 and contact member 46 of relay 43 and conductor 68. The travel motor will thus cause the work to move relative to the electrode during the welding operation. If for any reason the welding arc should go out or be shorted by reason of the electrode making contact with the work, relays 42 and 43 will operate in a manner to deenergize the travel motor by opening its circuit at contacts 47. Likewise, if the welding operation is stopped by operating stop button 25, thus deenergizing coil 23 of switch 22 and opening the switch, the circuit of the traverse motor 41 is interrupted at contacts 29 which are closed by contact member 27 when switch 22 is closed.

To stop the welding operation the operator will depress the stop button 25 which will interrupt the circuit of coil 23 of switch 22 and cause the same to open. Upon the opening of switch 22 feed motor 3 is deenergized as is also the time delay relay 31. If the switch member 30 is in the position shown, the circuit of travel motor 41 is also interrupted by the opening of the circuit at contacts 29. Thus the feed motor and the traverse motor will stop concurrently. The welding circuit, however, is not disconnected from the supply mains 20—21 at the same time due to the time delay characteristics of the relay 31. A certain number of seconds later, however, relay 31 will open thus deenergizing the electromagnetic switch 40 and opening the welding circuit. Thus with switch 30 in the position shown, upon operation of the stop button 25 the feed of the electrode 1 and the travel of the work relative to the electrode is arrested a certain predetermined interval of time before the opening of the welding circuit. If, however, the switch 30 is closed thus removing the control of contact member 27 over the circuit of the travel motor including contacts 29 the travel motor will not be stopped until contact 40 opens the welding circuit, causing relay 42 to drop out. When relay 42 drops out coil 43 is deenergized and contact member 46 of this relay opens the circuit of the travel motor 41 at contacts 47. It will thus be seen that when switch 30 is in the closed position the feed motor 3 and thus the feeding of the electrode 1 is stopped a predetermined interval of time before the welding circuit is opened and before the travel motor 41 is deenergized.

While I have shown and described a particular embodiment of my invention it will be obvious to those skilled in the art that changes and modifications may be made without departing from my invention. For example, in the system illustrated the energizing circuit of coils 16 and 17 may be completed through switch 22 and not through relay 31 which is then used solely to control the electromagnetic switch 40. Other arrangements of apparatus may advantageously be employed without departing from my invention which is not limited to any particular type of electrode feeding mechanism or to the constant potential, series resistor system illustrated since any type of feeding means and any type of welding system may be used. For example, I may use a generator such as disclosed in U. S. Letters Patent to Sven R. Bergman 1,340,004, May 11, 1920, as a source of welding current connecting the control circuits across the constant potential brushes. In fact any suitable source of supply may be used for the welding circuit and the control circuits. I therefore aim in the appended claims to cover all such changes and modifications as fall within the true spirit and scope of my invention.

What I claim as new and desire to secure by Letters Patent of the United States is:

1. An automatic arc welding apparatus of the type wherein the welding arc is maintained between the work and a fusible electrode, comprising means for feeding said fusible electrode toward the work to maintain the welding arc, a welding circuit including said electrode and the work, means external to the arc for opening said welding circuit, and means for stopping said feeding means a predetermined interval of time before operating said circuit opening means.

2. In an arc welding system wherein means are provided for feeding a fusible electrode to the arc to maintain the same, and wherein means are provided for opening the welding circuit external to the welding arc, means for stopping said feeding means, and means depending on the operation of said first-mentioned means for operating said circuit opening means a predetermined interval of time later.

3. An automatic arc welding apparatus, comprising means for feeding a fusible electrode to the work, a welding circuit including said electrode and the work, means external to the arc for opening said welding circuit, travel means for producing relative movement between said arc and the work, and means for stopping said feeding means and said travel means a predetermined interval of time before the operation of said circuit opening means.

4. An arc welding apparatus of the type wherein the welding arc is maintained between the work to be welded and a fusible electrode, comprising in combination electrode feeding means for feeding the electrode toward and from the work to strike the arc and toward the work to maintain the arc, and switching means for controlling said feeding means and the welding circuit including said electrode and work, said switching means being arranged to close the welding circuit substantially simultaneously with the energization of said feeding means but to open said circuit a predetermined interval of time subsequent to the deenergization of said feeding means.

5. An arc welding apparatus of the type wherein the welding arc is maintained between the work to be welded and a fusible electrode, comprising in combination electrode feeding mechanism including a feed motor, a switch for controlling said feed motor, a relay with a time delay opening characteristic controlled by said switch, and an electro-responsive switch in the welding circuit including said electrode and the work under the control of said relay.

6. Automatic arc welding apparatus comprising electrode feeding mechanism including a feed motor, a switch for controlling said feed motor, a relay with a time delay opening characteristic energized upon the closing of said switch and deenergized upon the opening of said switch, an electro-responsive switch in the welding circuit including said electrode and the work under the control of said relay, a travel motor for producing relative movement between said electrode and the work, means responsive to arc voltage and current for interrupting the circuit of said travel motor upon failure of arc voltage or current, additional means under the control of said initially operated switch for completing or interrupting the circuit of said travel motor upon the closing or opening of said switch, and means for eliminating the control imposed by said last-mentioned means.

In witness whereof, I have hereunto set my hand this 21st day of November, 1927.

FRANK M. JEFTS.